Sept. 15, 1959     H. W. MOORE     2,904,362
EQUIPOISE LOCK FOR BALANCING MACHINE
Filed Feb. 19, 1957
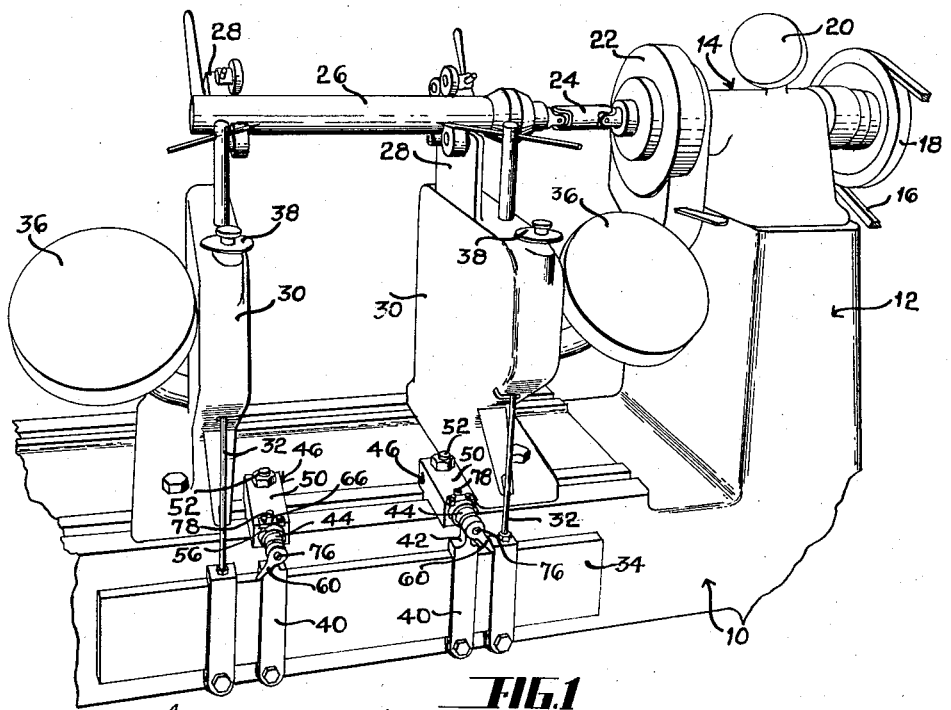
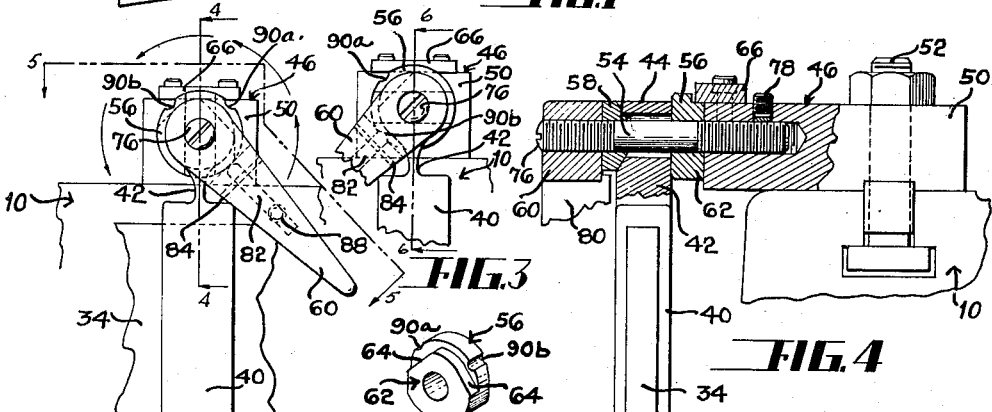
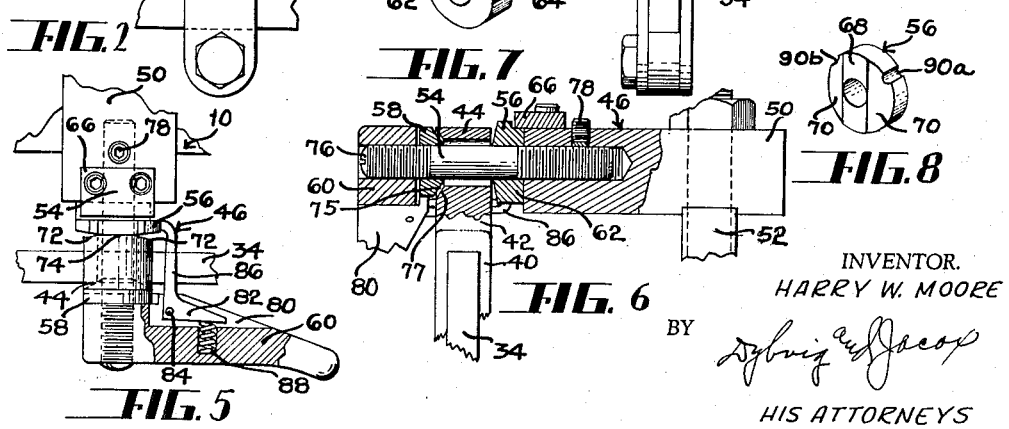
INVENTOR.
HARRY W. MOORE

United States Patent Office 2,904,362
Patented Sept. 15, 1959

2,904,362

EQUIPOISE LOCK FOR BALANCING MACHINE

Harry W. Moore, Sarasota, Fla.

Application February 19, 1957, Serial No. 641,197

7 Claims. (Cl. 287—99)

This invention relates to a locking device having particular utility in dynamic balancing machines wherein the locking device is employed to anchor an equipoise bar associated with the dynamic balacing machine in a fixed position in space, however, the utility of this locking device is not necessarily so limited.

An object of this invention is to provide a locking device for use in association with a balancing machine for anchoring the equipoise bar in a predetermined position relative to the balancing machine, which locking device is capable of releasing the equipoise bar to permit free oscillatory movement thereof sufficient for the requirements of the balancing machine.

Another object of this invention is to provide a locking device for fixedly securing a collar member, which locking device has two positions, a lock position and a release position, the operation being such that while in the lock position the locking device supports the collar member in a predetermined position in space and in the release position the locking device frees the collar member so that the collar member may execute free movement in a limited area in a fixed plane.

A further object of this invention is to provide a locking device for securing a collar member in a predetermined position in space, which locking device has two positions, one positively engaging the collar member and the other releasing and substantially fully disengaging the collar member.

Other objects and advantages reside in the construction of parts, the combination thereof, the method of manufacture and the mode of operation, as will become more apparent from the following description.

In the drawing,

Figure 1 is a perspective view of a conventional dynamic balancing machine embodying the present invention.

Figure 2 is an enlarged fragmentary elevational view of a portion of the balancing machine, showing one position of the locking device which is the subject of this invention.

Figure 3 is an enlarged fragmentary elevational view of the locking device in another position.

Figure 4 is a sectional view with parts broken away taken substantially along the line 4—4 of Figure 2.

Figure 5 is a plan view with portions shown in section taken substantially in the direction indicated by the line 5—5 of Figure 2.

Figure 6 is a sectional view with parts broken away taken substantially along the line 6—6 of Figure 3.

Figure 7 is a perspective view drawn to the scale of Figure 2 showing one end of a bushing employed in this invention.

Figure 8 is a perspective view drawn to the scale of Figure 2 showing the opposite end of the bushing of Figure 7.

Referring to the drawing in detail, Figure 1 illustrates a dynamic balancing machine including a bed 10 and, integral therewith, a support 12 supporting a drive assembly 14. The drive assembly is powered from an external motor, not shown, through a belt 16 engaging a pulley 18. An indicator 20 is provided in association with the drive assembly 14 for indicating the speed in revolutions per minute of the pulley 18.

The rotation of the drive assembly is transmitted through a commutator element 22 and a universal connection 24 to a work 26 which is to be balanced. The work 26 is supported for rotation on vibratory supports 28 housed in housings 30 supported by the bed 10. Shafts 32 connected to the vibratory supports 28 support an equipoise bar 34 in spaced parallel relation to the work 26.

The operation of the balancing machine is as follows. For each segment of the commutator element 22 a light is provided in a dial 36, there being one dial 36 associated with each vibratory support 28. The lights in the dials 36 are connected electrically to the individual commutator segments through adjustable contacts associated with the vibratory supports 28. These contacts are regulated by knobs 38, there being one knob 38 associated with each housing 30.

As the work 26 is set into rotation through the pulley 18 and rotated at very high speeds, the work 26 strives to rotate about its own center of mass. If the center of mass of the work 26 does not lie on the geometric axis of rotation established by the balancing machine, the vibratory supports 28 will oscillate such that the work 26 is permitted to rotate about its own center of mass. The electrical contacts associated with the vibratory supports 28 are adjusted through the knobs 38, such that electrical contact is made only when the vibratory supports 28 oscillate to an extreme position. The position of the light or lights illuminated in the dials 36 upon contact may be accurately correlated to the angular position of the work 26 at the instant of extreme departure of the geometric axis of the work 26 from the axis of induced rotation. This information can then be used in accordance with well established principles to ascertain the portion of the work 26 to which mass must be added or from which mass must be subtracted to balance the work 26 about its geometric axis. The equipoise bar 34 is employed to determine the amount of mass which must be added to or subtracted from the work 26 to balance the work.

As illustrated in Figure 1, two brackets 40 engage the equipoise bar 34 intermediate the rods 32. As shown in detail in Figures 2, 3, and 4, these brackets 40 each terminate in a small neck or reed portion 42, which connects to a collar member 44. Locking devices 46 which comprise the subject of this invention are employed to rigidly lock and to unlock the collar members 44 associated with the brackets 40.

When one of the collar members 44 is securely locked, the arrangement is such that the equipoise bar 34 when set into motion by the rods 32 is constrained to pivot about the locked collar member 44, the attached reed 42 being set into oscillatory motion. Due to the mechanical connection between the equipoise bar 34 and the vibratory supports 28 the work 26 is constrained to oscillate at a point aligned with the reed 42.

With this equipoise bar arrangement one end, or the other, of the work 26 may be effectively fixed in space such that the oscillation of the free end of the work 26 reflects only the unbalance in the center of mass associated with that end of the work. By adjusting the knob 38, which adjusts the contact associated with the vibratory support 28 at the free end of the work 26, until contact is made only at the extreme oscillation of the vibratory support 28, the magnitude of the oscillation can be ascertained. Appropriate calibration of the knobs 38, which may be provided with suitable indicia, may be made, such that the position of the knobs 38 will provide information regarding the mass which is to be added to or subtracted from the opposite ends of the work 26 so as to balance the work.

The balancing apparatus herein described is recognized as old in the art, and the operation of this balancing device has been reviewed solely to illustrate the importance of the role played by the locking device 46. Spurious information will be obtained with the balancing apparatus unless the locking devices 46 are capable of locking the collar members 44 accurately in the plane of the oscillating equipoise bar 34. Similarly, spurious results will be obtained if there is appreciable friction between the unlocked locking device and the collar member 44, as this friction will cause a reduction in the sensitivity of the apparatus to conditions of unbalance. Further, due to the fact that the weight added to or subtracted from the work 26 will be determined by calibration of each specific balancing machine, it is important that the point about which the equipoise bar 34 is constrained to oscillate is accurately reproduced. The locking device, which will now be described in detail, minimizes these problems.

Referring to Figure 4 of the drawing, the locking device 46 comprises a support 50 anchored to the bed 10 of the balancing machine by a suitable bolt 52. Threadedly engaging the support 50 is a shaft 54 which extends normal to the plane in which the equipoise bar 34 oscillates. The shaft 54 is journalled loosely in one of the collar members 44 associated with a bracket 40 and has a diameter materially less than the internal diameter of the collar member 44 such that the collar member 44 may oscillate about the shaft 54. A first bushing 56 is positioned adjacent the support 50 between the collar member 44 and the support. A second bushing 58 is positioned on the opposite side of the collar member 44, and a handle member 60 threadedly engaging the shaft 54 retains the bushing 58 in close proximity to the collar member 44.

As illustrated in Figure 7, the first bushing 56 has been milled on the end thereof which abuts the support 50 to provide an off-set cam segment 62 having cam surfaces 64 spaced 90° apart. The cam segment 62 cooperates with a stop 66 secured to the support 50 to limit rotation of the first bushing on the shaft 54 to substantially 90°. As shown in Figure 8, the opposite end of the bushing 56 is contoured by beveling diametrically opposite portions of the bushing 56 so as to provide a flat diametrically extending abutment surface 68 flanked by recessed portions or faces 70, the abutment surface 68 having a width equal substantially to the diameter of the shaft 54.

As illustrated in Figure 5, the end of the collar member 44 adjacent the bushing 56 is provided with a similarly contoured surface having recessed portions 72 and a diametrically extending abutment surface 74. The arrangement is such that the bushing 56 in one extreme position of its rotation, as determined by the cam segment 62, has its abutment surface 68 in registry with the abutment surface 74 of the collar member 44. In the opposite extreme position of the bushing 56, the abutment surfaces of the bushing 56 and the collar member 44 are out of registry. When these abutment surfaces are out of registry, the area of contact between the collar member 44 and the bushing 56 is reduced to a minimum such that the collar member 44 has a maximum freedom of motion relative to the bushing 56. Additionally, when these abutment surfaces are out of registry slight lateral movement of the collar member 44 toward the bushing 56 is permitted.

It should be noted here that the thickness of the bushing 56 is adjusted so that the abutment surface of the bushing 56, when that bushing abuts the support 50, positions the collar member 44 in the plane of oscillation of the equipoise bar 34. This dimension is critically maintained.

As illustrated in Figure 4, the bushing 58 has a conical surface 75 coaxial with the shaft 54 adapted to mate with a complementary conical recess 77 in the adjacent end of the collar member 44. As will be described subsequently, the conical bushing 58 operates to center the collar member 44 on the shaft 54 when the locking device is in the locked position.

The handle member 60 is so positioned on the shaft 54 that when the handle member has been rotated in a clockwise direction to lock the device, that is, to compress the bushing 58, the collar member 44 and the bushing 56 against the support 50, the handle member will be in substantially the position illustrated in Figure 2. This position may be pre-set by rotating the shaft 54, by means of a slotted screw head 76 provided at one end of the shaft 54, to the proper angular position, then locking the shaft 54 into position by means of a set screw 78 threadedly engaging the support 50 and adapted to lock against the threads at that end of the shaft 54.

As noted previously, the handle member 60 is illustrated in the locked position in Figure 2. In this position the second bushing 58 is in compressive engagement with the collar member 44, such that the conical surface thereof positions the collar member concentrically with the shaft 54. Further, the abutment surfaces 68 and 74 of the bushing 56 and the collar member 44, respectively, are in registry and in compressive engagement. The collar member 44 is thus fixedly located in the plane of the equipoise bar 34 at a predetermined elevation.

As illustrated in Figure 5, the handle member 60 is slotted at 80 to receive a trigger element 82. The trigger element 82 is pivotally secured to the handle member 60 at 84. The trigger element 82 is provided with an arm 86 extending substantially parallel to the shaft 54 to engage the periphery of the first bushing 56. The arm 86 is biased into compressive engagement with the periphery of the bushing 56 by a spring 88 coacting between the body of the handle member 60 and the trigger element 82.

A pair of dimples or depressions 90a and 90b spaced 90° apart are provided on the periphery of the bushing 56, each dimple being spaced approximately 45° from the center line of the abutment surface 68 of the bushing 56.

To release the collar member 44, the handle member 60 is rotated through a three-quarter turn in the counter-clockwise direction to the position illustrated in Figure 3. During the first quarter turn, the arm 86 of the trigger element 82 riding the periphery of the bushing 56, advances upon the depression 90a therein, while simultaneously the compressive forces are removed from the collar member 44. During the next quarter turn of the handle member 60, the trigger element 82 engaging the depression 90a rotates the bushing 90° to its opposite extreme position. During the final quarter turn of the handle member 60, the arm 86 of the trigger element 82 travels along the periphery of the bushing 56 to the dimple 90b. The dimple 90b in this position functions to hold the handle member 60 in the position of Figure 3 against the force of gravity. It is to be noted that a full turn of the handle member 60 is precluded by the reed 42 in the bracket member 40 which would engage and obstruct movement of the trigger element 82. The device may be returned to the lock position with a three-quarter turn in the clockwise direction, as viewed in Figure 2. In the first quarter turn the arm 86 engaging the dimple 90b in the bushing 56 rotates the bushing 90°, whereupon the arm 86 follows the periphery of the bushing past the dimple 90a as the device is ultimately locked.

Figure 6 illustrates the assembly in detail in the unlocked or release position, this figure being analogous to Figure 4. As illustrated therein, the counterclockwise rotation of the handle member 50 provides play in the bushing 58, such that the conical surface of the bushing 58 may disengage the conical recess in the collar member 44. Similarly, the bushing 56 has been rotated 90° to the point of minimum area of contact with the adjacent surface of the collar member 44. In this position the collar member 44 is free to execute limited oscillatory motion about the shaft 54 without interference from the locking device and in particular without interference from the bushings 56 and 58.

This locking device provides a highly compact, easily manipulated unit having two essential features. First, in the lock position, it securely locks the collar member 44 in a predetermined position in space. Second, in the release position, it disengages the collar member 44 so as to provide freedom for limited oscillatory motion of the collar member in a plane normal to the axis of the shaft 54, that is, the plane of the equipoise bar 34. The limited oscillatory motion permitted is sufficient for the operation of the balancing machine.

While this locking device has solved a particular problem with reference to effective utilization of the equipoise bar 34 in the specific apparatus of Figure 1, it is to be understood that the utilization of the locking device is not limited to this apparatus. For example, other types of balancing machines do not utilize the equipoise bar as described herein, but rather are operated by directly locking the vibratory supports 28. In such balancing machines, the locking device 46 may be effectively utilized for this purpose.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention I claim:

1. A locking device having two positions, one a lock position and the other a release position, for locking a collar member concentrically about a shaft in a fixed plane normal to the shaft, and for releasing said collar member so as to permit free movement of said collar member in said fixed plane, said locking device including means providing a support to which one end of said shaft is fixedly secured, a first bushing abutting said support and mounted for rotation on said shaft, means for limiting the rotation of said first bushing relative to said shaft between predetermined limits, said first bushing having a contoured surface on the end thereof opposite said support, said contoured surface including a first abutment portion occupying a plane normal to the axis of said shaft and portions recessed away from said plane, said collar member encircling said shaft adjacent said first bushing and having an internal diameter less than the diameter of said first bushing but exceeding the diameter of said shaft, said collar member having a contoured surface at one end thereof opposing the contoured surface of said first bushing, the contoured surface of said collar member including a second abutment surface parallel to said first abutment surface and portions recessed away therefrom, the construction and arrangement being such that said first abutment surface may be rotated by rotating said first bushing from a position in registration with said second abutment surface to a position in registration with the recessed portions of said collar member so as to minimize the area of contact between said first bushing and said collar member, a second bushing mounted upon said shaft adjacent said collar member on the side opposite said first bushing, said second bushing having a conical projection coaxial with the axis of said shaft projecting toward said collar member, said collar member having a complementary coaxial conical recess in the adjacent end thereof adapted to receive said conical projection, handle means threadedly engaging said shaft adjacent said second bushing, said handle means being rotatable in one direction to advance said second bushing toward said collar member so as to position said collar member concentrically on said shaft and to lock said collar member compressively between said first and second bushings, said handle means being rotatable in the opposite direction to release said collar member, and means responsive to rotation of said handle means for rotating said first bushing relative to said collar member between said predetermined limits so as to bring said first and second abutment surfaces into registry for locking said collar member and to move said first and second abutment surfaces out of registry for releasing said collar member.

2. The locking device according to claim 1 wherein said first bushing is provided with a dimple in the periphery thereof, and wherein the means responsive to rotation of said handle means for rotating said first bushing relative to said shaft includes a trigger element pivotally secured to said handle means having a projecting portion positioned adjacent the periphery of said first bushing and engageable with the dimple therein, and spring means coacting between said handle means and said trigger element biasing said projecting portion into compressive engagement with the periphery of said first bushing.

3. The locking device according to claim 1 wherein the means for limiting rotation of said first bushing between predetermined limits includes an off-set cam segment integral with said bushing abutting said support, and stop means engageable with said cam segment carried by said support, the construction and arrangement being such that said first bushing is rotatable upon said shaft through an angle equal substantially to 90 degrees.

4. The locking device according to claim 1 wherein the portions recessed away from the plane of the abutment portion of said first bushing, and the portions recessed away from the plane of the abutment portion of said collar member comprise beveled faces inclined to the plane of the abutment portion.

5. A locking device having two positions, one a lock position and one a release position, for locking a collar member in a fixed position in space, said locking device including a shaft journalled loosely in said collar member, means for fixedly supporting one end of said shaft, handle means threadedly engaging the other end of said shaft freely rotatable thereon, said collar member having a planar abutment surface on the end thereof adjacent said support, first means interposed between said collar member and said support providing a complementary planar abutment surface parallel to and selectively registrable with the abutment surface of said collar member, the construction and arrangement being such that the area of contact between said abutment surfaces is materially reduced when said surfaces are out of registry, second means engageable with said collar member for centering said collar member relative to said shaft, said handle means being rotatable between said lock and release positions to selectively bring said second means into compressive engagement and disengagement with said collar member, and means responsive to movement of said handle means between said lock and release positions for simultaneously bringing said abutment surfaces into and out of registry.

6. In a locking device for selectively locking and releasing a collar member or the like, said locking device including a shaft journalled in said collar member, means providing a support for one end of said shaft, a handle threadedly engaging the other end of said shaft and rotatable thereon between two extreme positions designated lock and release positions, and means interposed between said handle and said collar member providing a conical surface for engaging and centering said collar member on said shaft when said handle member is in the lock position and for disengaging said collar member when said handle is in the release position, the improvement wherein said collar member is provided with a planar abutment surface on the end thereof adjacent said support, and including means interposed between said collar member and said support providing a planar abutment surface parallel to and registrable with the abutment surface of said collar member, and means responsive to rotary movement of said handle between said lock and release positions for moving said abutment surfaces into and out of registry.

7. A locking device for selectively locking and releasing a collar journalled loosely on a shaft, said device including means providing a first elongate planar abutment at one end of said shaft, said collar having a second elongate planar abutment at one end thereof parallel to and registerable with said first abutment, a handle threadedly engaging the other end of said shaft, said handle being rotatable on said shaft to compress said collar between the handle and said first abutment, and means responsive to rotation of said handle for rotating said first abutment relative to said second abutment, the construction and arrangement being such that upon locking said collar, said first and second abutments are in registry so as to have maximum area of contact and upon releasing said collar, said first and second abutments are moved out of registry so as to have a reduced area of contact.

References Cited in the file of this patent

UNITED STATES PATENTS

| | | |
|---|---|---|
| 1,835,782 | Kearney | Dec. 8, 1931 |
| 2,289,200 | Lundgren | July 7, 1942 |
| 2,373,637 | Kylin | Apr. 10, 1945 |